United States Patent
Gage et al.

(10) Patent No.: US 9,508,368 B2
(45) Date of Patent: *Nov. 29, 2016

(54) SLIDER FOR HEAT ASSISTED MAGNETIC RECORDING INCLUDING A THERMAL SENSOR FOR MONITORING LASER POWER

(75) Inventors: Edward Charles Gage, Lakeville, MN (US); Lifu Zhou, Eden Prairie, MN (US); Michael Allen Seigler, Eden Prairie, MN (US); William Albert Challener, Glenville, NY (US); James Dillon Kiely, Edina, MN (US); Kaizhong Gao, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,603

(22) Filed: Mar. 21, 2011

(65) Prior Publication Data

US 2011/0228651 A1 Sep. 22, 2011

Related U.S. Application Data

(60) Provisional application No. 61/315,720, filed on Mar. 19, 2010.

(51) Int. Cl.
| | |
|---|---|
| G11B 11/00 | (2006.01) |
| G11B 5/48 | (2006.01) |
| G11B 5/31 | (2006.01) |
| G11B 5/00 | (2006.01) |

(52) U.S. Cl.
CPC ............ *G11B 5/4866* (2013.01); *G11B 5/314* (2013.01); *G11B 2005/001* (2013.01); *G11B 2005/0021* (2013.01)

(58) Field of Classification Search
CPC .......... G11B 5/4866; G11B 2005/001; G11B 2005/0021; G11B 5/6088
USPC ........... 369/13.26, 47.5, 47.51, 47.52, 53.26, 369/116, 13.33, 13.13, 13.32; 360/59, 360/125.31
See application file for complete search history.

(56) References Cited

U.S. PATENT DOCUMENTS

| | | | |
|---|---|---|---|
| 6,611,487 B2 | 8/2003 | Shimano et al. | |
| 6,671,248 B2 | 12/2003 | Miyabata et al. | |
| 6,944,112 B2* | 9/2005 | Challener | 369/112.27 |
| 7,057,999 B2 | 6/2006 | Cheong et al. | |
| 7,077,564 B2 | 7/2006 | Schloss et al. | |
| 7,589,928 B2 | 9/2009 | Roy et al. | |
| 2001/0030928 A1 | 10/2001 | Cheong et al. | |
| 2006/0221483 A1* | 10/2006 | Kamimura et al. | 360/59 |
| 2007/0159718 A1* | 7/2007 | Kim et al. | 360/125 |
| 2008/0204916 A1* | 8/2008 | Matsumoto et al. | 360/59 |
| 2009/0040645 A1* | 2/2009 | Shimazawa et al. | 360/59 |
| 2009/0225464 A1 | 9/2009 | Juang et al. | |
| 2009/0310459 A1 | 12/2009 | Gage et al. | |
| 2011/0122737 A1 | 5/2011 | Shimazawa et al. | |
| 2011/0228653 A1 | 9/2011 | Shimazawa et al. | |
| 2012/0008470 A1 | 1/2012 | Shimazawa et al. | |

* cited by examiner

*Primary Examiner* — Thomas Alunkal
(74) *Attorney, Agent, or Firm* — Holzer Patel Drennan (57) ABSTRACT

An apparatus includes a light source, a slider including a sensor having a resistance or voltage that varies with the temperature of the sensor, the sensor being mounted to be heated by a portion of light emitted by the light source, and a controller controlling the light source power in response to the resistance or voltage of the sensor.

18 Claims, 5 Drawing Sheets

SLIDER FOR HEAT ASSISTED MAGNETIC RECORDING INCLUDING A THERMAL SENSOR FOR MONITORING LASER POWER

CROSS REFERENCE TO RELATED APPLICATION

This application claims the benefit of U.S. Provisional Patent Application No. 61/315,720, filed Mar. 19, 2010, and titled "Incorporating A Thermal Resistance Sensor In A HAMR Slider To Monitor Laser Power", which is hereby incorporated by reference.

BACKGROUND

In heat assisted magnetic recording, information bits are recorded on a data storage medium at elevated temperatures, and the data bit dimensions can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region.

One example of a recording head for use in heat assisted magnetic recording generally includes a write pole and a return pole magnetically coupled to each other through a yoke or pedestal, and a waveguide for focusing light onto the storage medium. The waveguide is positioned between the write pole and the return pole. Light from a laser is coupled into the waveguide and transmitted through the waveguide to produce a tightly focused laser spot on the storage media. The power in this spot determines the width of the recorded track and the quality of the recorded transitions.

It would be desirable to have a method to measure or monitor the optical power once the head is assembled in a drive.

SUMMARY

In a first aspect, the disclosure provides an apparatus including a light source, a slider including a sensor having a resistance or voltage that varies with the temperature of the sensor, the sensor being mounted to be heated by a portion of light emitted by the light source, and a controller controlling the light source power in response to the resistance or voltage of the sensor.

These and other advantages which characterize the various embodiments of the present disclosure can be understood in view of the following detailed description and the accompanying drawings.

DETAILED DESCRIPTION

In one aspect of the disclosure, a thermal sensing element is mounted in or on a slider in a heat assisted magnetic recording system. Light is transmitted from a light source, such as a laser, to a transducer in a recording head that concentrates the light to produce a small spot of light on a surface of a recording medium. A small portion of the light is used to thermally induce a change in a physical property of the sensing element. The physical property can be, for example the sensor resistance or a voltage produced by the thermoelectric effect. The change in resistance or voltage is representative of the laser power. By sensing the change in the physical property from when the laser is switched from off to on, a signal can be detected during drive operation of the recording head and used to set the laser power to compensate for laser aging or laser thermal effects. The sensor is positioned to be exposed to a portion of the light in the slider. In general, the sensor responds to a portion of the light not being used to heat the medium.

In one embodiment, an optical absorbing material with a desired thermal resistance coefficient could be fabricated on the slider body in an area of optical emission or loss. In another embodiment, a material with the desired thermal resistance coefficient could be placed in proximity to an area where the temperature is affected by the optical power such as near the magnetic pole or near a near field transducer. In another embodiment, a thermocouple could be placed in proximity to an area where the temperature is affected by the optical power such as near the magnetic pole or near a near field transducer.

Figure 1:
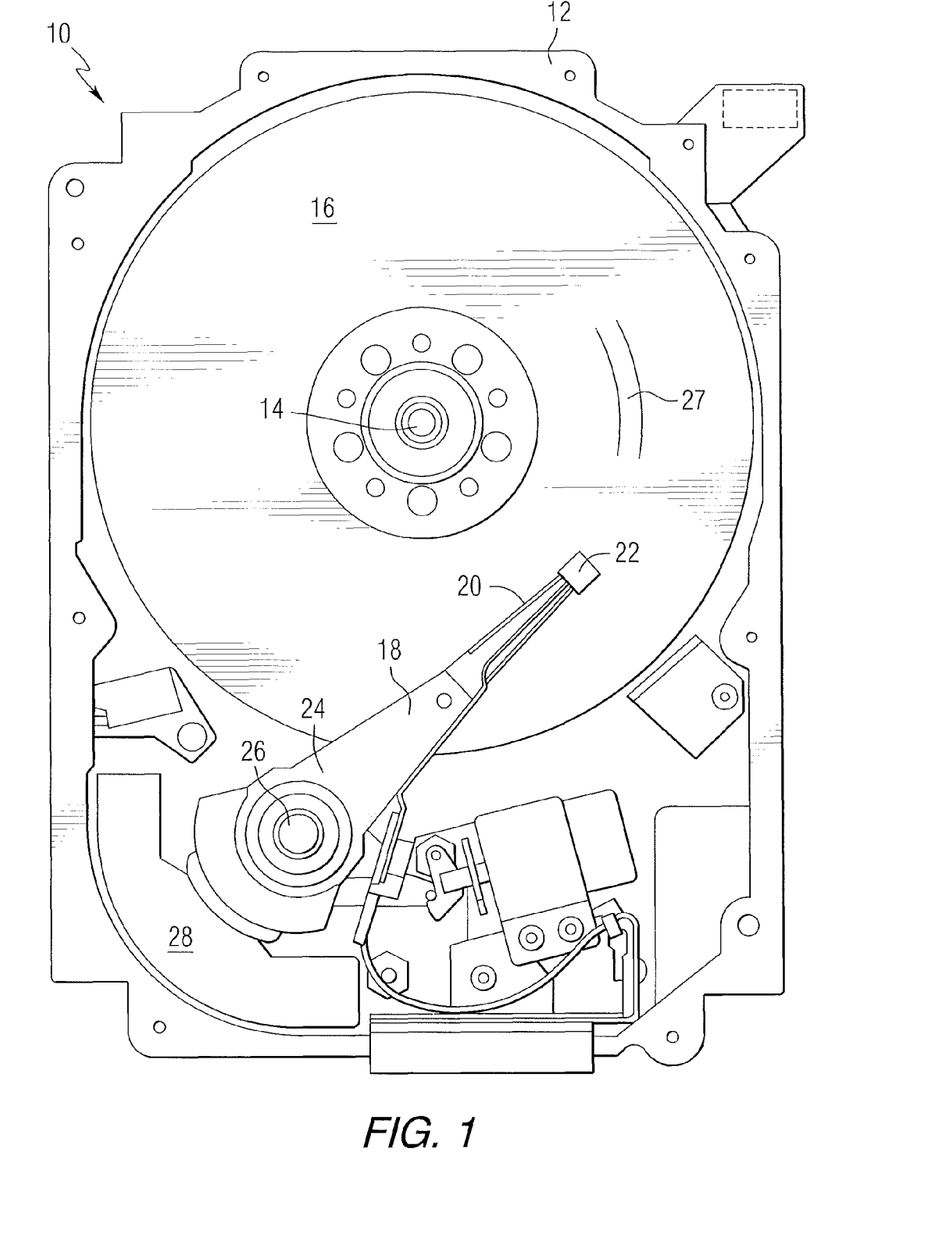
FIG. 1 is a pictorial representation of a data storage device in the form of a disc drive that can include an apparatus for monitoring or measuring light power in accordance with an aspect of this disclosure.

FIG. 1 is a pictorial representation of a data storage device in the form of a disc drive 10 that can include an apparatus for monitoring or measuring light power in accordance with an aspect of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic recording medium 16 within the housing. At least one arm 18 is contained within the housing 12, with each arm 18 having a first end 20 with a recording head or slider 22, and a second end 24 pivotally mounted on a shaft by a bearing 26. The arm serves as a positioning means to position the slider with respect to the recording medium. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), an electromagnetic wave of, for example, visible, infrared or ultraviolet light (generally referred to as light in this description) is directed onto a surface of a recording medium to raise the temperature of a localized area of the medium to facilitate switching of the magnetization of the area. One slider design includes a laser incorporated into the slider structure. Such a laser-in-slider (LIS) design includes elements that transmit light from the laser to a device that concentrates the light into a small spot on an adjacent recording medium. The light transmission elements may include a channel waveguide and a mirror or collimator for directing a light beam to a solid immersion minor (SIM) that focuses the light to an optical spot at or near an air bearing surface of the slider. A near field transducer may further confine and concentrate the light. As is known in the art, heat assisted magnetic recording is also called thermally assisted magnetic recording. In this description, heat assisted magnetic recording incorporates devices and methods in which data is recorded at elevated temperatures.

Figure 2:
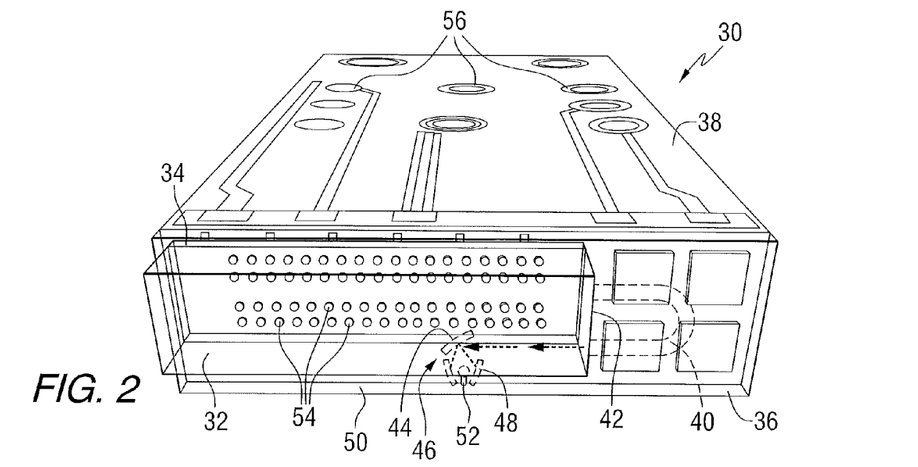
FIG. 2 is an isometric view of portions of a slider.

FIG. 2 is an isometric view of an example integrated laser-in-slider read/write head 30 that can include a thermal sensor. A laser diode 32 is mounted in an opening 34 in a trailing end 36 of a slider 38. An optical waveguide 40 is positioned in the slider adjacent to the trailing end. Light produced by the laser diode exits the output facet 42, is coupled into the waveguide, and reflected by a mirror 44 to a read/write head 46. The read/write head includes a solid immersion mirror 48 that concentrates the light to a small spot adjacent to an air bearing surface 50 of the slider, where the light is used to heat a portion of an adjacent storage medium. The read/write head can also include other components not shown in this view, such as a write pole and a read sensor. A near-field transducer (NFT) 52 can be included adjacent to the air bearing surface to further concentrate the light. The laser diode is shown as a rectangular structure which is bonded to the bottom of the opening by solder bumps 54. Top bond pads 56 that are used to electrically connect elements of the slider to a controller are shown on top of the slider. While FIG. 2 shows a laser-in-slider embodiment, it will be understood that other embodiments are within the scope of this disclosure. Such other embodiments include laser-on-slider embodiments in which a laser is mounted on a slider and a waveguide is used to direct light toward the storage medium.

Light is confined in a direct perpendicular to the plane of the trailing end by a planar/channel waveguide. For example in one design waveguide 40 is a channel waveguide and the solid immersion mirror 48 is a planar waveguide. The waveguides can be made of a dielectric material having a high index of refraction as the waveguide core such as, for example, $Ta_2O_5$, SiNx, ZnS, SiOxNy, Si or SiC, cladded by one or two dielectric materials having a low index of refraction such as $Al_2O_3$, $SiO_2$ or SiOxNy.

Figure 3:
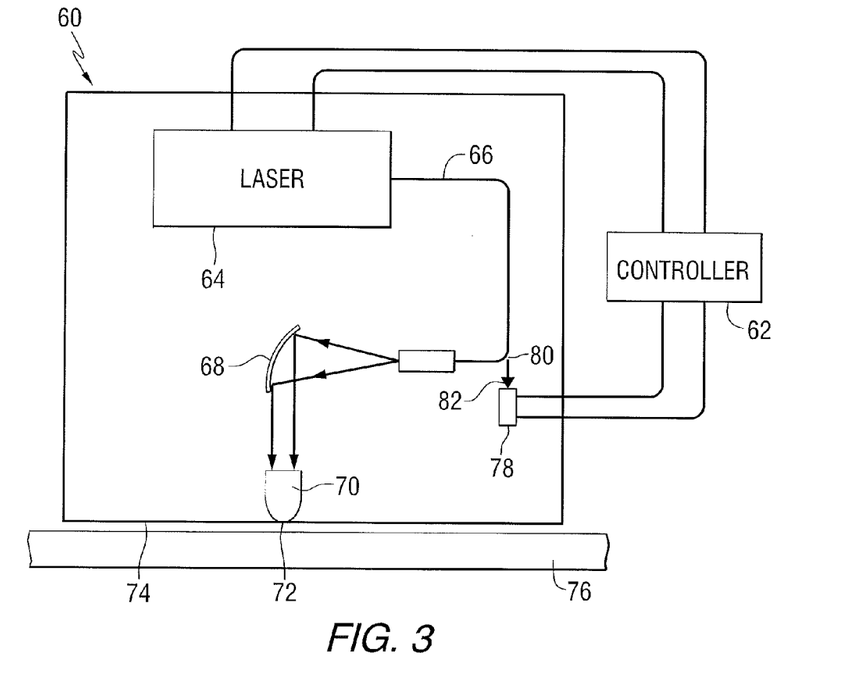
FIG. 3 is a schematic representation of portions of a slider and a controller.

In one aspect, this disclosure uses a sensor or sensing element that is mounted on or in the slider such that the sensor is exposed to a portion of the light produced by the laser or is otherwise heated directly or indirectly by the light. FIG. 3 is a schematic representation of portions of a slider 60 and a controller 62. The slider includes a laser 64 that directs light into a waveguide 66, which transmits the light to a mirror or collimator 68 that reflects the light to an optical transducer 70. The optical transducer concentrates the light to a small spot at a focal point 72, at or near the air bearing surface 74. This light is used to heat a portion of an adjacent recording medium 76. A sensor 78 is positioned such that it is exposed to light that leaks out of the waveguide at a bend 80, as illustrated by arrow 82. The leaked light strikes the sensor and raises its temperature. The controller is connected to the sensor and measures the electrical resistance or voltage of the sensor that changes with the amount of light that strikes the sensor. The controller then uses the measured resistance or voltage to control the power of the laser. In one example, the power of the laser can be controlled to produce a desired resistance or voltage at the sensor.

The controller can include electronics that sample the resistance or voltage of the sensor that is representative of the laser power during a data write operation. A change in laser power causes a change in the sensor resistance or voltage when the laser is switched from off to on. The change in value of the resistance or voltage is then used to produce a signal representative of the laser power. The controller can compare the measured laser power to a desired laser power based on disc radii and stored in a lookup table. The lookup table of desired laser power can be constructed by optimizing recording. During drive build and during periodic drive optimizations, test tracks are written as a function laser power. The recording performance (wherein figures of merit may include bit error rate, written track amplitude, written track width, channel quality monitor, and signal to noise ration) is optimized at the lowest acceptable laser power. This laser current and sensor signal amplitude can be stored in the lookup table. With temperature changes, a change in laser power for a given current, or a change in recording performance after a fixed amount of time or after a number of writes, the drive could write test tracks to update the lookup table. In some cases, the laser may be energized even during reading in order to minimize laser rise time when writing is desired. In these cases, the laser power could be sensed during reading to determine whether the laser power is not high enough to damage recorded information but still high enough to reduce laser rise time. During operation of the drive, the controller can consult the lookup table to determine the parameters necessary to drive the laser to produce the desired laser output.

The specific implementation of the laser power sensor may depend on the light delivery system used in the slider. Many different HAMR light delivery designs have been previously disclosed. Such designs include laser-in-slider or laser-on-slider assemblies and designs where the laser is separate from the slider. The sensor could be fabricated during wafer processing or attached during slider or head gimbal assembly (HGA) fabrication. The sensor could be, for example, a platinum strip. For different HAMR slider designs there are a number of potential places where a light sensitive sensor could be fabricated, including, but not limited to, the locations shown in FIGS. 4 and 5.

Figure 4:
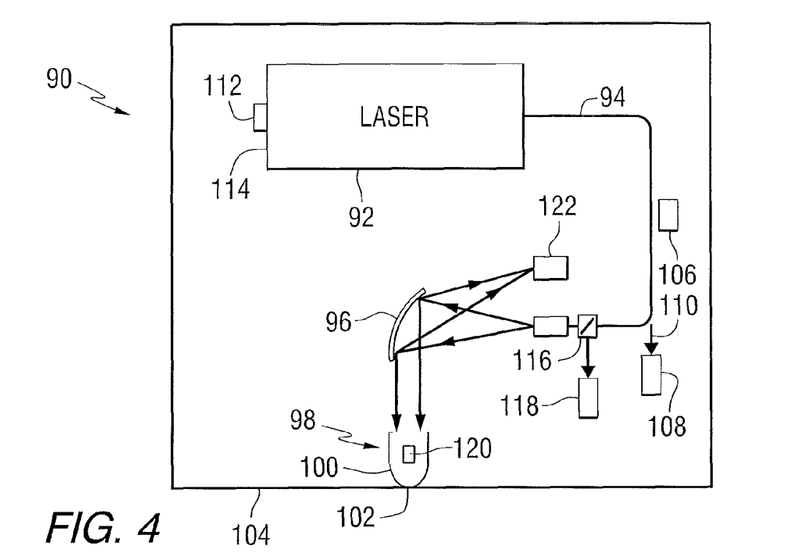
FIG. 4 is a schematic representation of portions of a slider showing possible locations of a thermal sensor.

FIG. 4 is a schematic representation of portions of another slider 90, which shows various possible locations for the sensor. The slider includes a laser 92, a channel waveguide 94, a reflector 96 and a recording head 98 including a planar solid immersion mirror 100 that concentrates the light to a point 102 adjacent to an air bearing surface 104. A sensor 106 could be bonded to the surface of the channel waveguide to sense the scattered radiation or a sensor 108 could be fabricated below the bend to detect light that leaks out of the waveguide, as illustrated by arrow 110. The amount of scattering or loss from the bend can be controlled during device fabrication by changing the material properties or device processing.

In another embodiment, a thermal sensor 112 could be positioned to capture the rear facet emission from the back 114 of the laser cavity. For example, the light coming out of the back of the laser could hit the sensor. Alternatively, a splitter grating, or mirror 116 could be used to direct a small portion of the light to a thermal sensor 118. In another example the sensor 120 could be mounted in or on the planar solid immersion mirror 100. In another example, the mirror or collimator 96 could be constructed to reflect a portion of the light to a thermal sensor 122. In another example, the thermal sensor can be positioned adjacent to a write pole in the read/write head. The write pole can be positioned behind the planar solid immersion mirror 100 in FIG. 4.

Each sensor in FIG. 4 would be electrically connected to a controller, as shown in FIG. 3. The controller would then use the measured sensor parameter to control the laser power. The sensor can be subjected to a portion of the light before the light exits the slider at the air bearing surface 104. The portion of light that strikes the sensor is light that is not used to heat the surface of the recording medium. In another embodiment, the sensor can be subjected to light that is reflected from the storage medium. Any change in optical efficiency such as laser to waveguide coupling or laser efficiency (i.e., the ratio of output optical power to input electrical current) can be corrected by the controller using measured sensor parameter.

As shown in FIG. 4, the sensor could be positioned to capture the rear facet emission from the back of the laser cavity. The light coming off of the back of the laser could hit this resistor instead of hitting a detector. The sensor can take the form of a wire that could be built during the slider fabrication. The wafer could be etched to expose the surface of the laser cavity, or it could be just a micron or so past the cavity wall, since the material (e.g. alumina) will be transparent.

A splitter grating, mirror, or wave guides litter could be used to sample a small portion of the light, such as creating a splitter to branch off some of the light from the channel waveguide, as shown in FIG. 4. The sensor can be in the form of a wire that is fabricated across or parallel with the channel waveguide. The amount of absorption can be set by properly placing the wire with respect to the waveguide and with the choice of materials.

Figure 5:
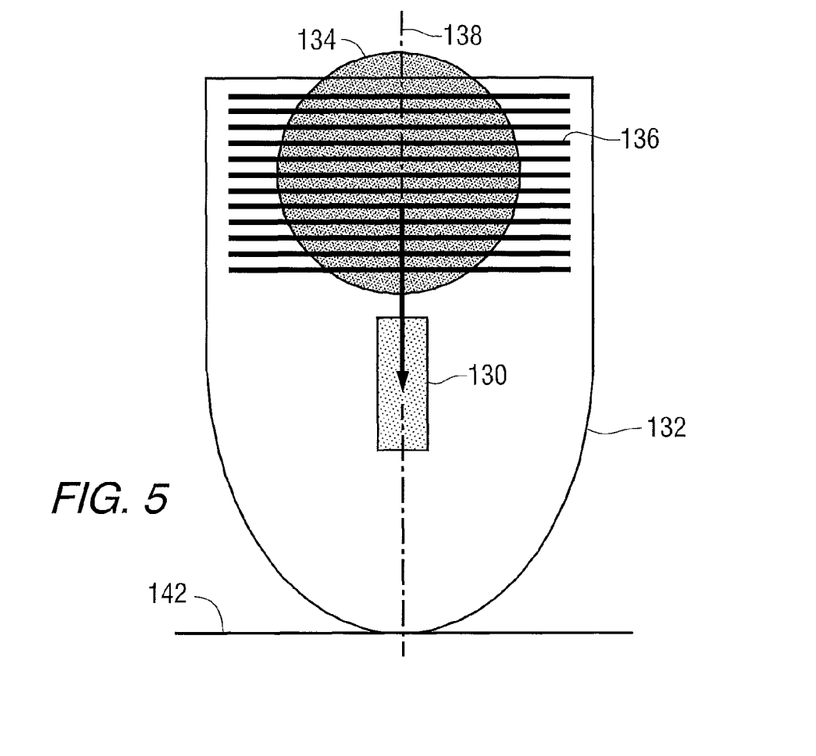
FIG. 5 is a schematic representation of a solid immersion mirror.

FIG. 5 is a more detailed drawing of another sensor 130 adjacent to or embedded in a planar solid immersion mirror (PSIM) 132. A spot of light, represented by circle 134, impinges on a grating coupler 136 to couple the light into the waveguide. The grating coupler could be a single grating as shown in FIG. 5, or a spilt grating with a gap between two grating portions along the central axis 138 of the PSIM. The sensor 130 can be positioned to detect the light in an unused portion of the beam such as the tails of the intensity distribution or in the center of the PSIM. Again, a controller would be used to measure a change in the relevant sensor characteristic. In another example, reflected light from the air bearing surface 142 could be used to change the sensor resistance.

The detailed design of the laser power sensor may depend on the light delivery system design. In general the sensor may be fabricated during wafer processing. In one example the sensor can be a platinum wire resistive thermal detector (RTD) positioned in a region where it would be heated by the incident optical power. Two leads would be connected to the RTD and brought out through the recording head's electrical connection. A simple circuit could be used to measure the resistance when the laser is on and when the laser is off. This value could be converted into optical laser power using a calibration constant measured during HGA fabrication. The laser power could then be controlled to optimize recording performance.

For the PSIM of FIG. 5 there are a number of potential places where a sensor could be positioned. For example, if a thin film resistor is placed in the center of a PSIM as shown in FIG. 5, one can estimate about how much resistance variation will be expected for a 1 mW incident beam on the grating. One may also assume that the incident beam is modulated.

There also are a number of electrical elements in existing recording heads, whose resistance changes as a function of temperature. These include the heater, thermal proximity sensor, the reader, and the writer. In one embodiment, an existing thermal proximity sensor can be used. The difference in the resistance of the thermal proximity sensor will vary with laser power if the sensor is close enough to the optical path.

In another example, light reflected from the air bearing surface could be used to affect the resistance of the sensor. In another example, the temperature in an area of the head with an optically absorbing feature (such as a magnetic pole) can be monitored. Alternatively, the sensor can be placed as close as possible to the near field transducer to monitor the near field transducer temperature.

Figure 6:
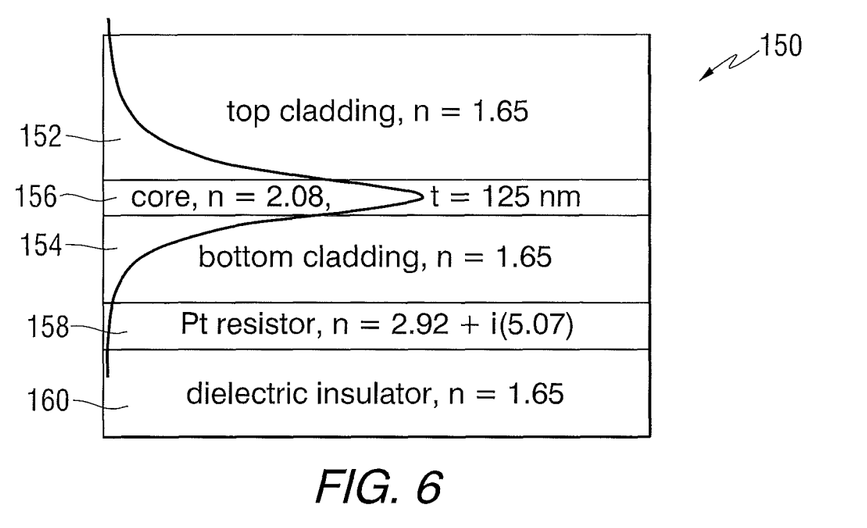
FIG. 6 is a cross-sectional view of a sensor and a portion of a waveguide.

The wire type sensor can be applied to the channel waveguide (CWG) by running the wire across or parallel (along or down the middle) to the CWG. FIG. 6 is a cross-sectional view of a sensor and a portion of a waveguide. In the example of FIG. 6, the waveguide 150 includes a top cladding layer 152 and a bottom cladding layer 154, with a core layer 156 sandwiched between the cladding layers. A thermal sensor 158, which in one example can be a platinum wire, is positioned adjacent to the bottom cladding layer, on a side opposite the core. A dielectric insulator 160 is positioned adjacent to the thermal sensor. The amount of absorption can be controlled by properly placing the sensor with respect to the waveguide and with the choice of material. In one example, the cladding layers and substrate have an index of refraction of 1.65, the core has an index of refraction of 2.08 and a thickness of 125 nm, and the Pt wire (resistor) has an index of refraction of 2.92+i(5.07).

Figure 7:
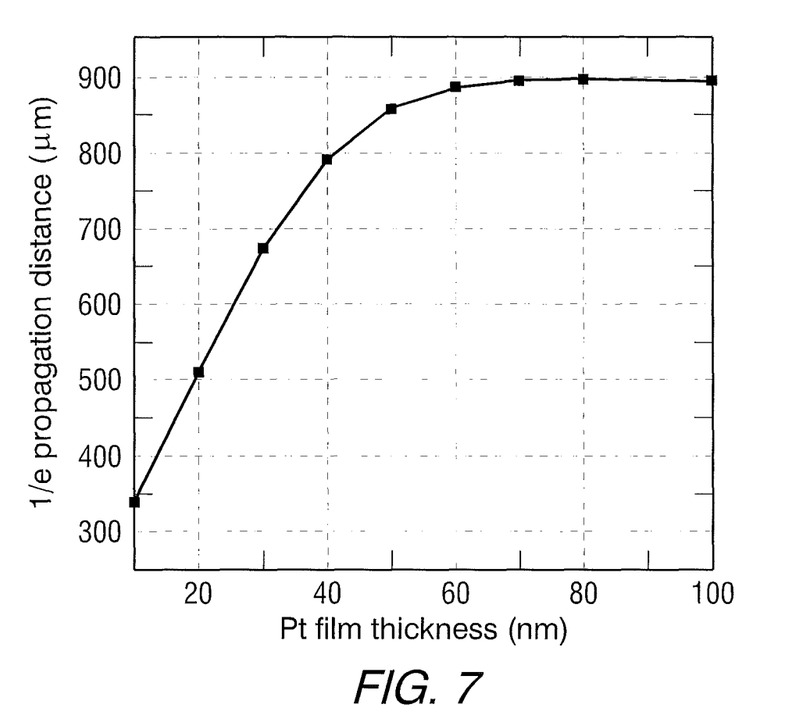
FIG. 7 is a graph of propagation distance versus film thickness.
Figure 8:
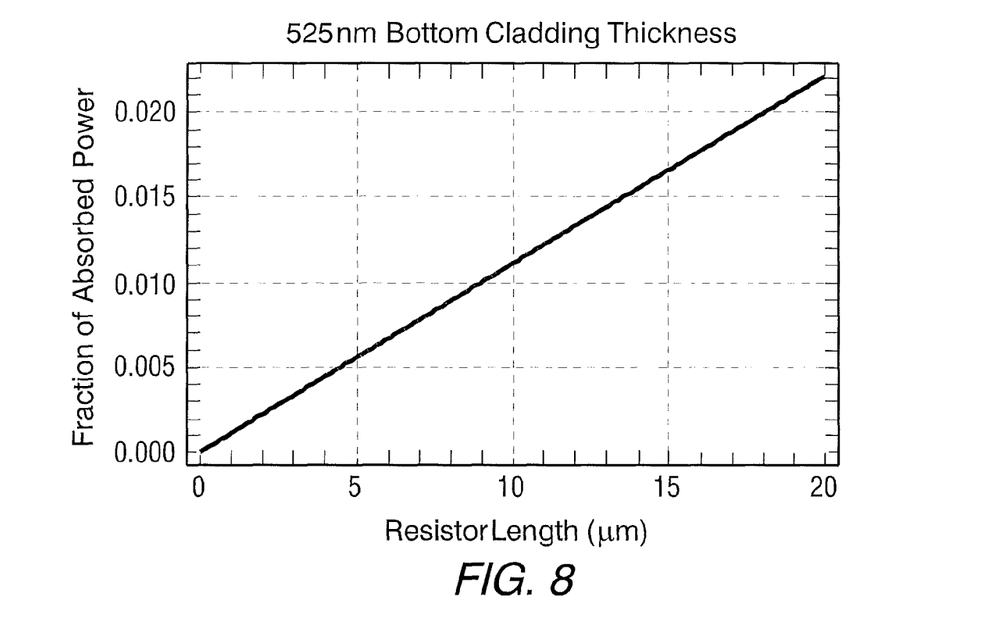
FIG. 8 is a graph of fraction of absorbed power versus resistor length.

FIG. 7 is a graph of propagation distance versus Pt film thickness for a 525 nm bottom cladding thickness. If a thin film resistor is placed underneath the planar waveguide, as shown in FIG. 6, it will absorb a small fraction of the energy propagating in the waveguide. In particular, for the film stack shown in FIG. 6, if one assumes that the resistor is platinum with an index of 2.92+i(5.07) at a wavelength λ, of 830 nm, with a thickness of 50 nm, then the propagation distance for which the intensity of the transverse electric (TE) mode drops to 1/e of its initial value can be calculated. For a bottom cladding thickness of 525 nm, the propagation distance of the transverse electric mode is about 900 μm. For other metals, the propagation distance is similar or shorter. However, if the bottom cladding thickness is increased to 820 nm, the propagation distance increases to 1.5 cm. From FIG. 7, it can be seen that a thinner resistive film has a shorter propagation distance. Thus a PT film thickness of about 10 nm may be chosen. The absorbed power can be further increased by moving the resistive film closer to the waveguide core. FIG. 8 is a graph of fraction of absorbed power versus resistor length for a Pt resistor for a 525 nm bottom cladding thickness.

Figure 9:
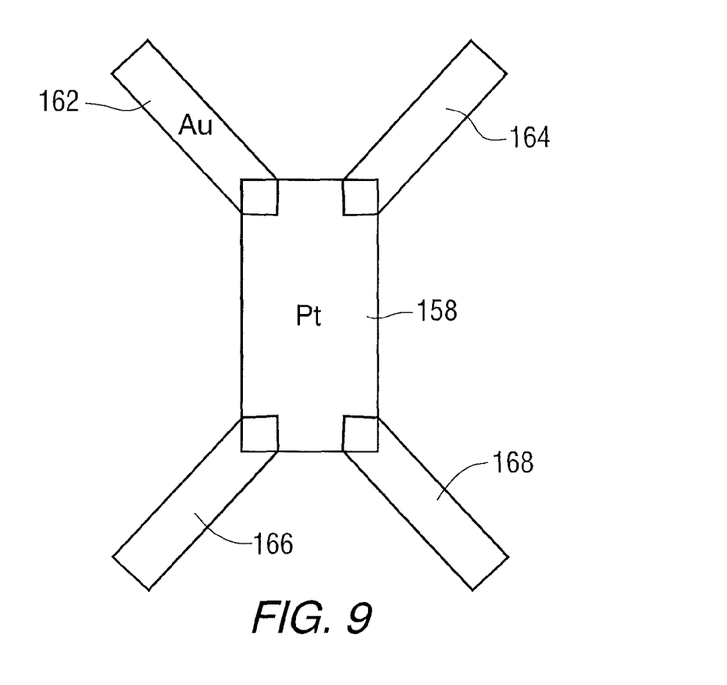
FIG. 9 is a schematic representation of a sensor element.

FIG. 9 is a schematic representation of a sensor element 158 including a wire strip and four electrical contacts 162, 164, 166 and 168, which can be, for example, gold. If one may assume a realistic length for the resistor of 20 μm, the fraction of power that would be absorbed by the sensor adjacent to a waveguide with a 525 nm bottom cladding will be 2.2% and with an 820 nm bottom cladding, the fraction of power that would be absorbed by the sensor will be 0.13%.

The resistor absorbs light for a time interval Δt, while the light is on. It is assumed that the light is turned off for a sufficiently long time for the resistor to cool back to the ambient temperature. In other words, the thermal time constant is small compared with the on time of the laser and the short compared with the off time of the laser. In this case, it can be assumed that the temperature rise of the resistor when the light is on will be primarily determined by the heat capacity of the resistor, that is, the thermal conduction to the first order can be neglected. The heat capacity of platinum, C, is about 130 J/kg K, and its density, d, is 21.5 g/cm$^3$. For a resistor with a with W, length L, and thickness T, the temperature will rise by $\Delta T$ in time $\Delta t$ for an absorbed power of P, where $$\Delta T = \frac{P\Delta t}{Cd(LWT)}. \quad (1)$$

For one example, let the spot size d=50 µm, the width of the resistor W=6 µm, the length L=20 µm, and thickness T=0.05 µm. About 11% of the power in the incidence spot occurs in this stripe of width W. If one mW is incident and the grating coupling efficiency is 50%, then about 0.055 mW of light propagates toward the resistor. For the thin bottom cladding (e.g., 525 nm), the absorbed power is about 1.2 µW. For the thick bottom cladding (e.g., 820 nm), the absorbed power is about 0.072 µW. According to equation (1), if the light is on for 10 ns, then this will cause a temperature rise of about $7.2\times10^{-4}$ C for the thin bottom cladding and about $4.3\times10^{-5}$ C for the thick bottom cladding.

The resistivity of platinum is $1.06\times10^{-7}$ $\Omega$m. The lengthwise resistance of this resistor strip is, therefore, about 7.1$\Omega$ according to $$R = \frac{\rho L}{WT}. \quad (2)$$

The temperature coefficient of resistance, $\alpha$, for platinum is 0.003729. The change in resistance will be $$\Delta R = \alpha R = \frac{(\alpha \Delta T)\rho L}{WT} \propto \frac{\alpha \rho \Delta t}{CdW t^2 D}, \quad (3)$$

which is $2.7\times10^{-4}$% with a thin bottom cladding and $1.6\times10^{-5}$% with a thick bottom cladding. This corresponds to a resistance change of about 20 µ$\Omega$ for the thin bottom cladding in about 1.1 µ$\Omega$ for the thick bottom cladding. These are very small numbers, but it should be remembered that these values can be increased by increasing the incident power from the laser or increasing the resistor length. In Equation (3), it can be seen that the resistance change is inversely proportional to the width of the resistor and the spot size. It is also inversely proportional to the thickness of the resistor squared, although this equation does not take into account the variation in absorbed optical power as the resistor is made thinner. Surprisingly, the propagation distance decreases as the resistor layer is made thinner. For a thickness of 10 nm, for example, the resistor is 35$\Omega$ and the 1/e propagation distance for the transverse electric mode is only 337 µm. A 20 µm long resistor will absorb about 5.8% of the incident power in the waveguide mode. For a 1 mW incident power over 10 ns, this causes a temperature rise of about 0.0095° C. in the resistor or a resistance change of about 1.2 m$\Omega$, which should be easily measurable.

To calibrate the sensor, the bit error rate versus sensor resistance could be measured. The sensor resistances can be determined for power=0 and for optimal power. If these resistance values fall outside of some pre-determined range, then some defect might be present.

In one aspect, the disclosure provides an apparatus such as a disc drive including a storage medium, a light source, slider including a sensor having a resistance or voltage that varies with temperature of the sensor, the sensor being mounted to be heated by a portion of light emitted by the light source, a controller controlling the light source in response to the resistance or voltage of the sensor, and an arm for positioning the slider adjacent to the storage medium.

In another aspect, the disclosure provides a method that includes exposing a thermal sensing element in a slider to a portion of light emitted by a light source in the slider, measuring a resistance or voltage of the thermal sensing element, and controlling the light source in response to the resistance or voltage of the sensor. The light source can be energized at different levels during non-writing and writing operations. For example, the light source can be energized at a low level during reading (or other non-writing) and a higher level during writing.

The slider temperature, laser temperature, laser voltage and laser power may be measured to predict that something is going wrong with the laser or head and to give the user/system a warning to backup their data as soon as possible. The slider's ambient temperature changes could also be measured with a thermistor elsewhere in the drive.

If the amount of light scattered out of the channel waveguide or off of a bending mirror is relatively constant, the sensor can simply be bonded on top of the light path. An initial calibration of the laser power versus resistance could be performed at the HGA test and stored for that HGA in the drive.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a light source;
    a waveguide receiving light from the light source and having a bend;
    a slider including a sensor having a resistance or voltage that varies in response to temperature of the sensor, the sensor being mounted below the bend to be heated by a portion of light emitted by the light source that leaks out of the waveguide at the bend; and
    a controller controlling the light source in response to the resistance or voltage of the sensor.

2. The apparatus of claim 1,
    wherein the sensor is positioned adjacent to the waveguide.

3. The apparatus of claim 1,
    wherein the sensor is positioned in a central portion of the waveguide along the length of the waveguide.

4. The apparatus of claim 1, wherein the sensor comprises one of:

a wire, thin film resistor, heater element, thermal proximity detector, reader, writer, or thermocouple.

5. The apparatus of claim 1, wherein the sensor comprises:
a platinum wire.

6. The apparatus of claim 1, further comprising:
a lookup table relating light source power to sensor resistance or voltage, wherein the controller consults the lookup table to control the light source.

7. The apparatus of claim 1, wherein the sensor is exposed to light reflected from a storage medium.

8. The apparatus of claim 1, wherein the controller limits power to the light source in a non-writing condition.

9. An apparatus comprising:
a storage medium;
a light source;
a slider including a sensor having a resistance or voltage that varies in response to temperature of the sensor, the sensor being mounted to be heated by a portion of light emitted by the light source via a bend in a waveguide receiving the light from the light source;
a controller controlling the light source in response to the resistance or voltage of the sensor; and
an arm for positioning the slider adjacent to the storage medium.

10. The apparatus of claim 9,
wherein the sensor is positioned adjacent to the waveguide.

11. The apparatus of claim 9,
wherein the sensor is positioned in a central portion of the waveguide.

12. The apparatus of claim 9,
wherein the sensor is positioned adjacent to the bend.

13. The apparatus of claim 9, wherein the sensor comprises one of:
a wire, thin film resistor, heater element, thermal proximity detector, reader, writer, or thermocouple.

14. A method comprising:
exposing a thermal sensing element in a slider to a portion of light emitted by a light source in the slider, wherein the portion of the light is leaked from a bend in a waveguide receiving the light emitted by the light source;
measuring a resistance or voltage of the thermal sensing element; and
controlling the light source in response to the resistance or voltage of the sensor.

15. The method of claim 14, wherein the light source is energized at different levels during non-writing and writing operations.

16. An apparatus comprising:
a slider;
a light source;
a sensor included with the slider and having an electrical characteristic that varies responsive to a temperature of the sensor, the sensor being heatable by a portion of light emitted from the light source and leaked from a bend of a waveguide receiving the light, wherein the portion of the light is optically received by the sensor and wherein the light source is controllable responsive to the electrical characteristic of the sensor.

17. The apparatus of claim 16 wherein the electrical characteristic is a one of a resistance and voltage.

18. The apparatus of claim 16 wherein the sensor is adjacent to the bend in the waveguide.

* * * * *